United States Patent
Kanayama et al.

(10) Patent No.: US 7,204,605 B2
(45) Date of Patent: Apr. 17, 2007

(54) ILLUMINATING DEVICE AND PROJECTION TYPE VIDEO DISPLAY APPARATUS

(75) Inventors: Hideyuki Kanayama, Kyoto (JP); Takashi Ikeda, Osaka (JP); Yasuo Funazou, Nara (JP); Yoshitaka Kurosaka, Osaka (JP); Yoshihiro Yokote, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 115 days.

(21) Appl. No.: 10/760,367

(22) Filed: Jan. 21, 2004

(65) Prior Publication Data

US 2004/0189956 A1    Sep. 30, 2004

(30) Foreign Application Priority Data

Jan. 22, 2003   (JP)   ............................. 2003-013387
Sep. 26, 2003   (JP)   ............................. 2003-335242

(51) Int. Cl.
    *F21V 9/00*    (2006.01)
(52) U.S. Cl. .................. 362/230; 362/231; 362/330; 362/555; 362/559; 362/561; 362/800; 349/5; 349/7
(58) Field of Classification Search ............... 362/230, 362/231, 330, 559–561, 612, 623, 800, 555; 353/31, 33, 34, 37, 94; 349/5, 7
    See application file for complete search history.

(56) References Cited

U.S. PATENT DOCUMENTS 5,610,763 A * 3/1997 Kudo ..................... 359/619
5,649,753 A * 7/1997 Masumoto ................ 353/102
6,561,654 B2 * 5/2003 Mukawa et al. ........... 353/31
6,688,747 B2 * 2/2004 Wichner et al. ........... 353/29
2002/0154277 A1 10/2002 Mukawa et al.
2002/0186349 A1 12/2002 Wichner et al.
2005/0013132 A1 * 1/2005 Kim et al. ................ 362/231

FOREIGN PATENT DOCUMENTS

JP    2000-305040        11/2000
JP    2002-174854 A1     6/2002
JP    2002-296679 A1     10/2002

OTHER PUBLICATIONS

Chinese Office Action issued in corresponding Chinese Patent Application No. CN 2004100010137, Dec. 7, 2006.

* cited by examiner

*Primary Examiner*—Stephen F Husar
*Assistant Examiner*—Meghan K. Dunwiddie
(74) *Attorney, Agent, or Firm*—McDermott Will & Emery LLP

(57) ABSTRACT

The auxiliary light source has LED chips respectively emitting red lights arranged therein in an array shape, and has lens cells for parallelizing light arranged therein on the light exit side of the LED chips, for example. The LED chip is arranged in correspondence with each of lenses composing a pair of fly's eye lenses, and the pair of lenses introduces the light emitted from the LED chip into the whole surfaces of liquid crystal panels. A mixing mirror transmits white light emitted from a main light source and reflects light emitted from the auxiliary light source, and mixes the white light and the auxiliary light respectively emitted from both the light sources and introduces the mixed lights into the pair of fly's eye lenses.

16 Claims, 8 Drawing Sheets (a)

(b)

(a)

(b)

(a)

(b)

(a)

(b)

ILLUMINATING DEVICE AND PROJECTION TYPE VIDEO DISPLAY APPARATUS

BACKGROUND OF THE INVENTION

Field of the Invention

The present invention relates to an illuminating device and a projection type video display apparatus.

Commonly used as an illuminating device for a liquid crystal projector or the like has been one comprising a white lamp such as an ultra-high pressure mercury lamp, a metal halide lamp, or a xenon lamp and a parabola reflector for changing its irradiated light into parallel light. Further, in recent years, it has been considered that a light emitting diode (LED) is used as an auxiliary light source, to compensate for light having a wavelength component which is considered to be insufficient from the viewpoint of color reproduction in a white lamp (a white light source and particularly, a mercury-based discharge lamp) (see JP-A-2002-174854). In addition, there has existed a projection type video display apparatus using as an illuminating device a multiple-light illuminating device using a plurality of light sources (see JP-A-2002-296679).

In improving the color reproduction in the white light source using the light emitting diode or the like as an auxiliary light source, however, a further improvement has been required.

SUMMARY OF THE INVENTION

In view of the foregoing circumstances, an object of the present invention is to provide a practical illuminating device using a light emitting diode or the like as an auxiliary light source and a projection type video display apparatus using the same.

In order to solve the above-mentioned problem, an illuminating device according to the present invention is an illuminating device comprising a white light source, and an auxiliary light source emitting light having a wavelength component which is considered to be insufficient from the viewpoint of color reproduction in the white light source, characterized in that the white light source and the auxiliary light source are arranged such that their respective optical axes cross each other, and light mixing means for mixing light from the white light source and light from the auxiliary light source and emitting the mixed lights is provided at the position where the optical axes cross each other.

In the above-mentioned configuration, the light from the white light source and the light from the auxiliary light source are mixed by the light mixing means, so that the wavelength component which is considered to be insufficient from the viewpoint of color reproduction in the white light source is compensated for.

In the above-mentioned configuration, the auxiliary light source may have a plurality of solid-state light sources respectively emitting parallel lights arranged therein, and an optical integrator for preventing the lights respectively emitted from the solid-state light sources from being introduced in a nonuniform state onto an object to be illuminated may be provided on the light exit side of the light mixing means. This makes it possible to avoid such demerit that the respective lights from the solid-state light sources are introduced in a nonuniform state onto the object to be irradiated.

A pair of fly's eye lenses may be provided as the optical integrator, and each of the solid-state light sources and each of lenses composing the pair of fly's eye lenses may correspond to each other.

An illuminating device according to the present invention is an illuminating device comprising a white light source, and an auxiliary light source emitting light having a wavelength component which is considered to be insufficient from the viewpoint of color reproduction in the white light source, characterized in that used as the auxiliary light source is one emitting only red light in a predetermined wavelength range, the auxiliary light source is arranged around a light emission area of the white light source, and there is provided an optical integrator for preventing the lights respectively emitted from the light sources from being introduced in a nonuniform state onto an object to be illuminated.

Furthermore, an illuminating device according to the present invention is an illuminating device comprising a white light source, and an auxiliary light source emitting light having a wavelength component which is considered to be insufficient from the viewpoint of color reproduction in the white light source, characterized in that the white light source has a square light emitter by restricting a round light emitter using a shading plate, the auxiliary light source is arranged on the shading plate, and there is provided an optical integrator for preventing the lights respectively emitted from the light sources from being introduced in a nonuniform state onto an object to be illuminated.

The auxiliary light source may have a plurality of solid-state light sources respectively emitting parallel lights arranged therein, a pair of fly's eye lenses may be provided as the optical integrator, and each of the solid-state light sources and each of pairs of lenses composing the pair of fly's eye lenses may correspond to each other.

An illuminating device according to the present invention is an illuminating device comprising a white light source comprising a concave reflecting element, and an auxiliary light source emitting light having a wavelength component which is considered to be insufficient from the viewpoint of color reproduction in the white light source, characterized in that the light emitted from the auxiliary light source is condensed in the vicinity of a light emitting point of the white light source.

Furthermore, an illuminating device according to the present invention is an illuminating device comprising a white light source, and an auxiliary light source emitting light having a wavelength component which is considered to be insufficient from the viewpoint of color reproduction in the white light source, characterized in that light emitted from the white light source as well as the light emitted from the auxiliary light source are condensed at a predetermined position, and a light incidence surface of a rod prism which is an optical integrator is located at the predetermined position.

The auxiliary light source may have a plurality of solid-state light sources arranged therein, and each of the solid-state light sources may have a condenser element.

An illuminating device according to the present invention is characterized by comprising a first light source and a second light source respectively emitting nearly parallel lights, and an optical member having a first optical element for introducing the light emitted from the first light source in a particular direction and a second optical element for introducing the light emitted from the second light source in a direction parallel to the particular direction alternately arranged therein, a white light source being provided as the first light source, and an auxiliary light source emitting light having a wavelength component which is considered to be insufficient from the viewpoint of color reproduction in the white light source being provided as the second light source.

Furthermore, an illuminating device according to the present invention is characterized by comprising a first light source emitting nearly parallel lights, an optical member having a plurality of optical elements for respectively introducing the lights emitted from the first light source in particular directions formed therein with predetermined spacing, and a second group of light sources arranged among the optical elements and respectively emitting nearly parallel lights in directions parallel to the particular directions, a white light source being provided as the first light source, and an auxiliary light source emitting light having a wavelength component which is considered to be insufficient from the viewpoint of color reproduction in the white light source being provided as the second group of light sources. The auxiliary light source may have a plurality of solid-state light sources respectively emitting nearly parallel lights arranged therein.

In the illuminating device comprising the solid-state light sources, there may be provided as the solid-state light sources ones respectively emitting lights having different wavelengths, and there may be provided means for driving each of the solid-state light sources to selectively emit the light. This makes it easy to enlarge the adjustable range of color reproduction.

A projection type video display apparatus according to the present invention is characterized by comprising any one of the above-mentioned illuminating devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

An illuminating device and a projection type video display apparatus according to an embodiment of the present invention will be described on the basis of FIGS. 1 to 7.

Figure 1:
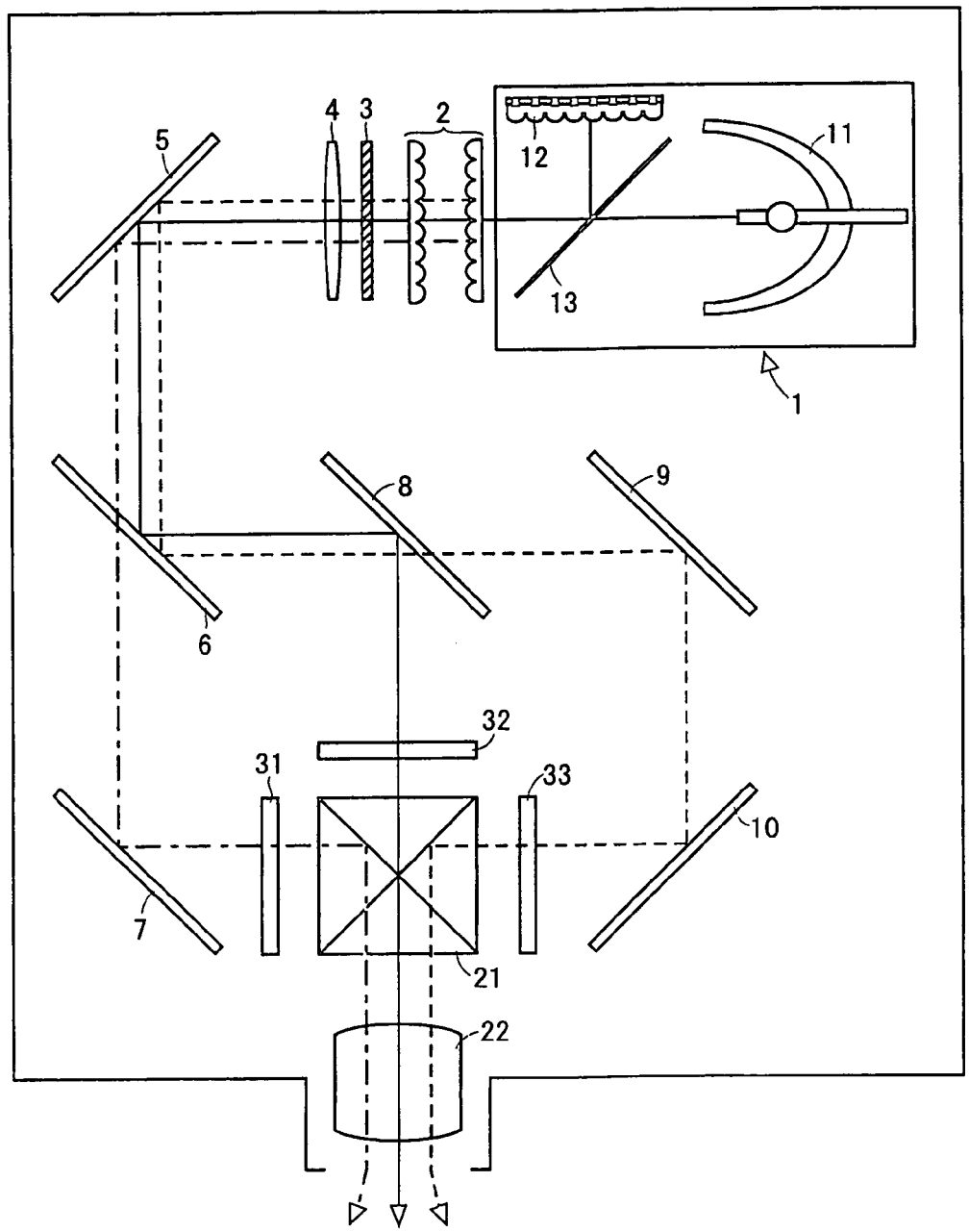
FIG. 1 is an explanatory view showing an optical system in a projection type video display apparatus according to an embodiment of the present invention.
Figure 1:

FIG. 1 is a diagram showing an optical system in a three-panel projection type video display apparatus. In such a projection type video display apparatus, light emitted from an illuminating device 1 is introduced into a pair of fly's eye lenses 2. Each of pairs of lenses composing the pair of fly's eye lenses 2 integrates the light emitted from the illuminating device 1 and introduces the integrated light into the whole surfaces of liquid crystal panels 31, 32, and 33. The light which has passed through the pair of fly's eye lenses 2 is introduced into a polarization conversion system 3.

The polarization conversion system 3 is composed of a polarizing beam splitter array (hereinafter referred to as a PBS array). The PBS array comprises polarized light separating surfaces and a phase plate (½ λ plate). Each of the polarized light separating surfaces in the PBS array passes P-polarized light of light from the pair of fly's eye lenses 2 and changes an optical path of S-polarized light by 90 degrees, for example. The S-polarized light whose optical path has been changed is reflected on the adjacent polarized light separating surface and is emitted as it is. On the other hand, the P-polarized light which has passed through the polarized light separating surface is emitted after being converted into S-polarized light by the phase plate provided on the front side (on the light exit side). That is, nearly all the lights are converted into S-polarized lights in this case. The light which has passed through the polarization conversion system 3 is introduced into a first dichroic mirror 6 through a condenser lens 4 and a mirror 5.

The first dichroic mirror 6 transmits light in a red wavelength band and reflects light in a cyan (green+blue) wavelength band. The light in the red wavelength band which has passed through the first dichroic mirror 6 is reflected on a mirror 7 so that its optical path is changed. The red light reflected on the mirror 7 is optically modulated by passing through the transmission type liquid crystal panel for red light 31. On the other hand, the light in the cyan wavelength band which has been reflected on the first dichroic mirror 6 is introduced into a second dichroic mirror 8.

The second dichroic mirror 8 transmits light in a blue wavelength band and reflects light in a green wavelength band. The light in the green wavelength band which has been reflected on the second dichroic mirror 8 is introduced into the transmission type liquid crystal panel for green light 32, and is optically modulated by passing through the liquid crystal panel 32. The light in the blue wavelength band which has passed through the second dichroic mirror 8 is introduced into the transmission type liquid crystal panel for blue light 33 via mirrors 9 and 10 (a relay lens or the like is not illustrated), and is optically modulated by passing through the liquid crystal panel 33.

Each of the liquid crystal panels 31, 32, and 33 comprises a polarizer arranged on the incident side, a panel constructed by sealing a liquid crystal between a pair of glass boards (having a pixel electrode and an alignment layer formed therein), and a polarizer arranged on the emitting side. Modulated lights (video lights in respective colors) modulated by respectively passing through the liquid crystal panels 31, 32, and 33 are mixed by a dichroic prism 21, to be color video light. The color video light is enlarged and projected by a projection lens 22, and is projected and displayed on a screen (not shown)

Figure 2:
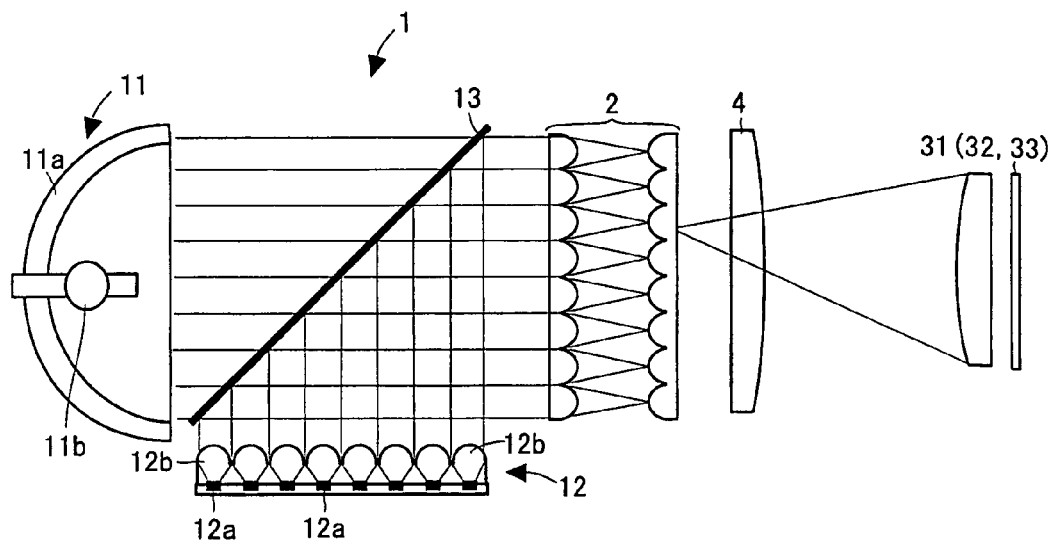
FIG. 2 is an explanatory view showing an illuminating device according to the present embodiment used in the projection type video display apparatus shown in FIG. 1.

The illuminating device 1 comprises a main light source 11, an auxiliary light source 12, and a mixing mirror 13, as also illustrated in FIG. 2. The main light source 11 and the auxiliary light source 12 are arranged such that their respective optical axes cross each other, and the mixing mirror 13 is provided at the position where the optical axes cross each other so that light from the main light source 11 and light from the auxiliary light source 12 are mixed.

The main light source 11 comprises a parabolic concave mirror (parabolic reflector) 11a and a light emitter 11b, and almost parallelizes white light and emits the parallelized white light. The light emitter 11b is composed of an ultra-high pressure mercury lamp, a metal halide lamp, a xenon lamp, or the like.

The auxiliary light source 12 has LED chips 12a arranged therein in an array shape, and has lens cells for parallelizing light 12b arranged therein on the light exit side of the LED chips 12a. The overall size of the auxiliary light source 12 is made approximately the same as the size of the pair of fly's eye lenses 2. The LED chips 12a are molded by transparent resin, and the transparent resin is formed in a projected shape to constitute the lens cells 12b. The LED chip 12a is arranged in correspondence with each of pairs of lenses composing the pair of fly's eye lenses 2, and the pair of lenses introduces light emitted from the LED chip 12a into the whole surface of the liquid crystal panel 31 (32, 33). The LED chip 12a and the lens cell 12b are formed in a square shape. Further, their respective aspect ratios coincide with or almost coincides with an aspect ratio of the liquid crystal panel 31 (32, 33). This makes it possible to efficiently introduce the light emitted from the LED chip 12a into the whole surface of the liquid crystal panel 31 (32, 33), thereby improving the utilization efficiency of the emitted light.

Figure 3:
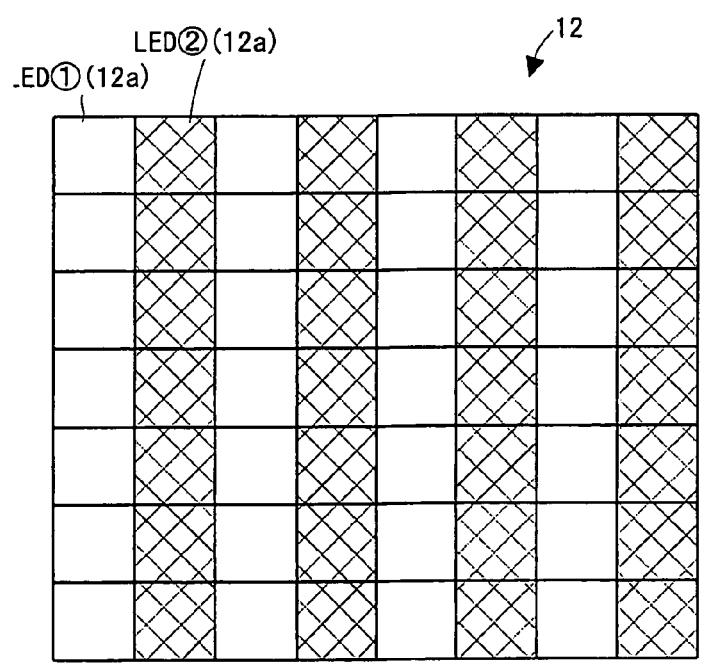
FIG. 3 is an explanatory view of an auxiliary light source used in the illuminating device shown in FIG. 2.

Selected as the LED chip 12a is one emitting light having a wavelength component of red which is considered to be insufficient from the viewpoint of color reproduction in the main light source 11. Of course, only the LED chips respectively emitting lights having the same wavelength need not be provided. For example, LEDs ① (12a) and LEDs ② (12a) respectively emitting lights having different wavelengths in a red light range may be arranged, as also illustrated in FIG. 3. Further, a switch may be provided such that the LED chips 12a can be selectively energized separately divided into a group of LEDs ① (12a) and a group of LEDs ② (12a) so that the LED chips 12a can be driven to selectively emit the lights. This makes it possible to increase or decrease the amount of light having a predetermined wavelength component to enlarge the adjustable range of color reproduction. The LED chips individually produced may be arranged in an array shape to serve as the auxiliary light source 12.

The mixing mirror 13 is so constructed as to have the property of transmitting white light emitted from the main light source 11 as well as to have a high reflection action on a wavelength component of the light emitted from the auxiliary light source 12, and can mix the white light emitted from the main light source 11 and the light emitted from the auxiliary light source 12 and introduces the mixed lights into the pair of fly's eye lenses 2.

Figure 4:
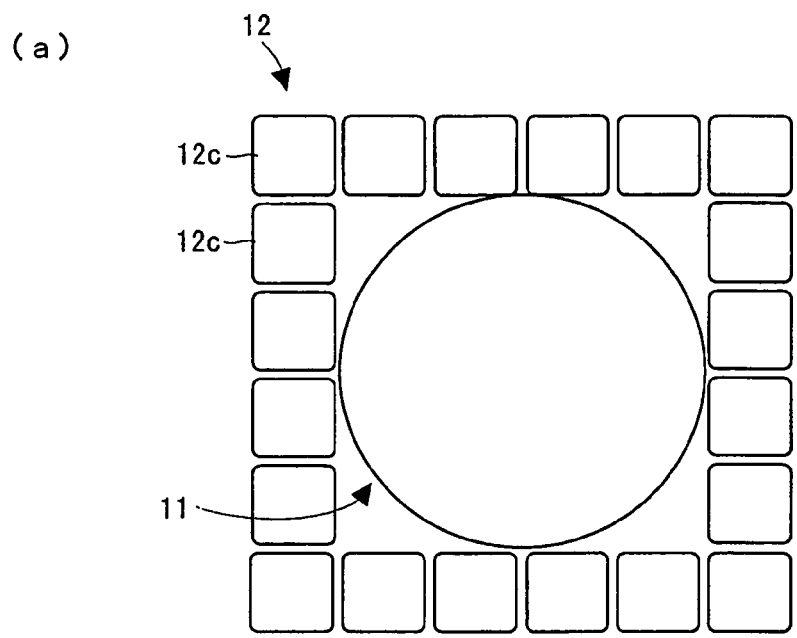
FIG. 4 is an explanatory view showing an illuminating device in another example of the present invention, where FIG. 4 (*a*) is a front view, and FIG. 4 (*b*) is a diagram for explaining the function thereof.
Figure 4:
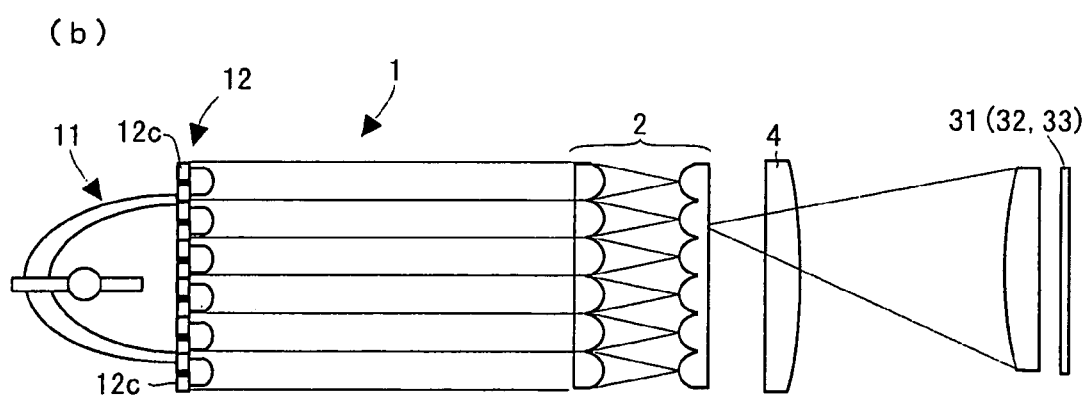

FIGS. 4 (a) and 4 (b) illustrate another example of the illuminating device 1. In the illuminating device 1, an axis of light emitted from a main light source 11 and an axis of light emitted from an auxiliary light source 12 are made parallel to each other, and the auxiliary light source 12 is positioned around a parabolic concave mirror 11a in the main light source 11. In a configuration shown in FIG. 4, LEDs 12c, which respectively emit parallel lights, individually produced are arranged around the parabolic concave mirror 11a, to constitute the auxiliary light source 12, and a group of lenses composing a pair of fly's eye lenses 2 is constructed in correspondence with the arrangement. In the configuration shown in FIG. 4, arranged as the LEDs 12c are ones respectively emitting only red lights in a predetermined wavelength range. The LED 12c is formed in a square shape. Further, its aspect ratio coincides with or almost coincides with an aspect ratio of a liquid crystal panel 31 (32, 33). This makes it possible to efficiently introduce the light emitted from the LED 12c into the whole surface of the liquid crystal panel 31 (32, 33), thereby improving the utilization efficiency of the emitted light. A configuration in which LEDs respectively emitting red lights having different wavelengths out of the above-mentioned red lights in the predetermined wavelength range are provided and are driven to selectively emit the lights may be employed. Further, employed as the main light source 11 may be one having a square light emission port.

Figure 5:
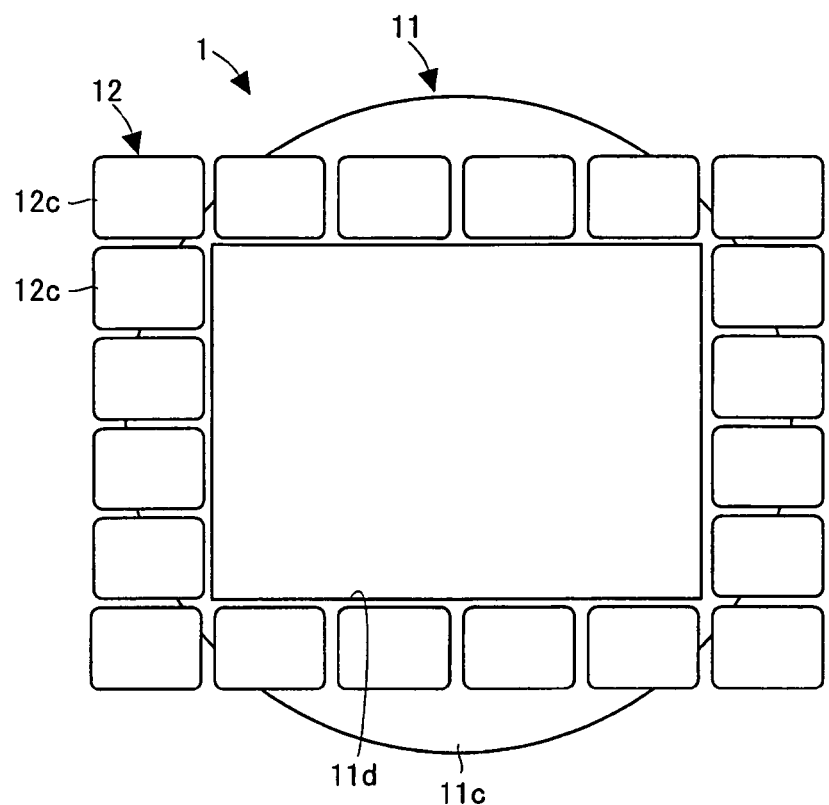
FIG. 5 is an explanatory view showing an illuminating device in still another example of the present invention, where FIG. 5 (*a*) is a front view, and FIG. 5 (*b*) is a diagram for explaining the function thereof.
Figure 5:
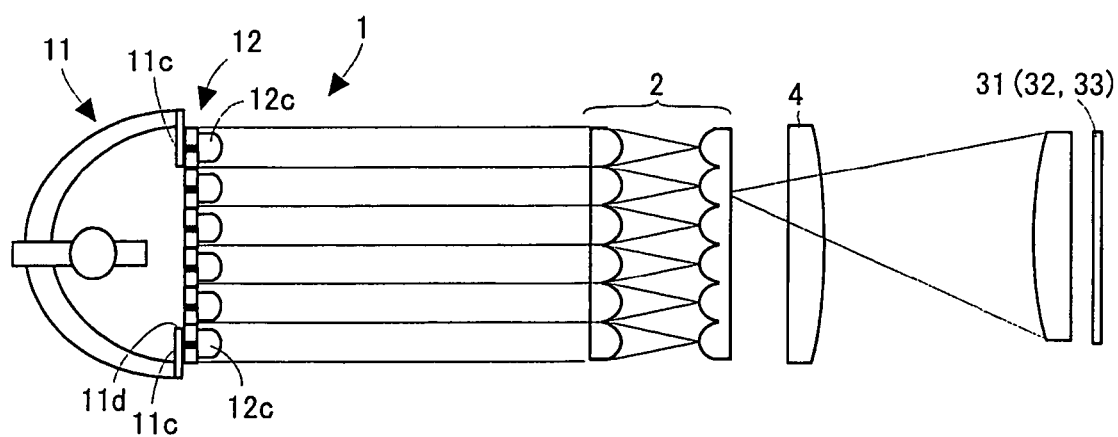

FIGS. 5 (a) and 5 (b) illustrate still another example of the illuminating device 1. In the illuminating device 1, an axis of light emitted from a main light source 11 and an axis of light emitted from an auxiliary light source 12 are made parallel to each other, and the auxiliary light source 12 is positioned around a light emission area of the main light source 11. Used as the main light source 11 is one in which a light emission opening of a parabolic concave mirror 11a is circular, while a shading portion 11c is provided in the circular opening of the parabolic concave mirror 11a such that a square opening 11d is obtained. A reverse surface of the shading portion 11c is a mirror surface, thereby achieving effective utilization of unnecessary light. Further, the auxiliary light source 12 is positioned on the shading portion 11c, thereby achieving effective utilization of a space. In a configuration shown in FIG. 5, LEDs 12c, which respectively emit parallel lights, individually produced are arranged around the square opening 11d to serve as the auxiliary light source 12, and a group of lenses composing a pair of fly's eye lenses 2 is constructed in correspondence with the arrangement. The LED 12c is formed in a square shape. Further, its aspect ratio coincides with an aspect ratio of a liquid crystal panel 31 (32, 33). This makes it possible to efficiently introduce the light emitted from the LED 12c into the whole surface of the liquid crystal panel 31 (32, 33), thereby improving the utilization efficiency of the emitted light. A configuration in which LEDs respectively emitting red lights having different wavelengths in the above-mentioned predetermined wavelength range are provided and are driven to selectively emit the lights may be employed.

Figure 6:
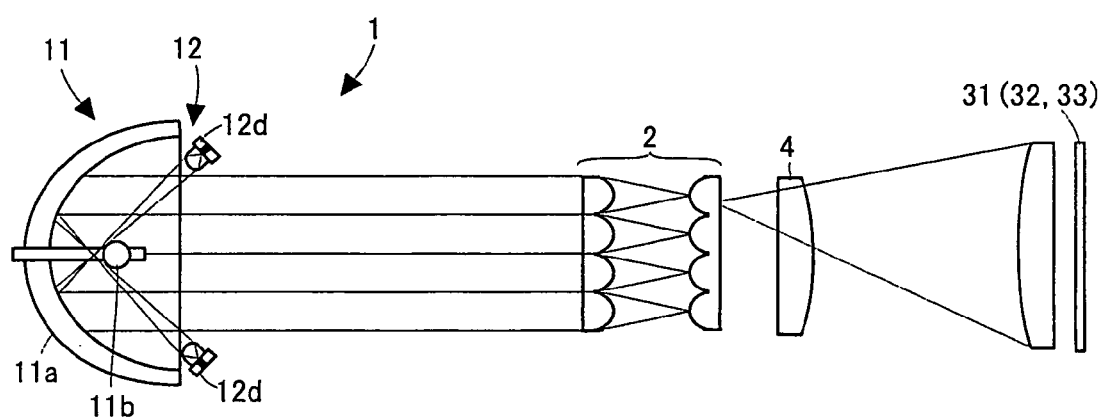
FIG. 6 is an explanatory view showing an illuminating device in a further example of the present invention, where FIG. 6 (*a*) is a diagram for explaining the function thereof, and FIG. 6 (*b*) is a diagram for explaining an arrangement relationship between a main light source and an auxiliary light source.
Figure 6:
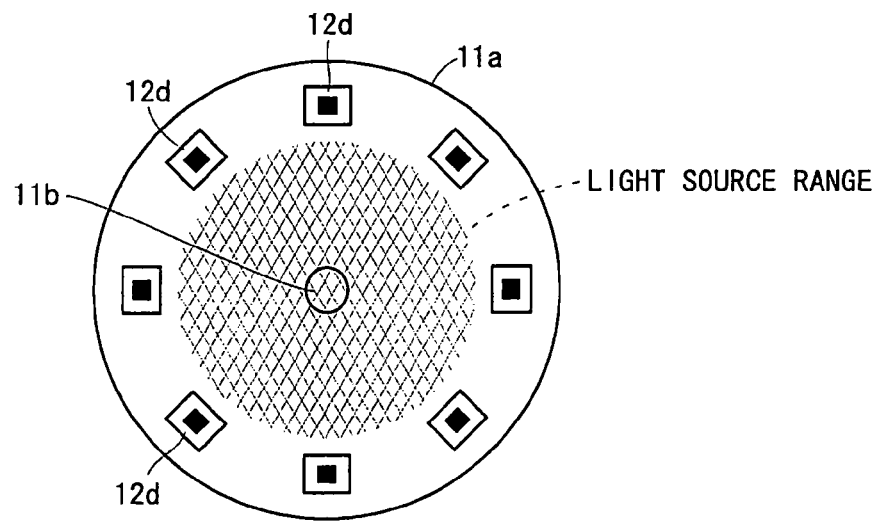

FIGS. 6 (a) and 6 (b) illustrate a further example of the illuminating device 1. An auxiliary light source 12 in the illuminating device 1 has LEDs 12d arranged therein in an annular shape in correspondence with a circular opening of a parabolic concave mirror 11a. The LED 12d comprises a lens for condensing emitted light, and is provided such that a light converging point is in the vicinity of a light emitting point of a main light source 11.

Figure 7:
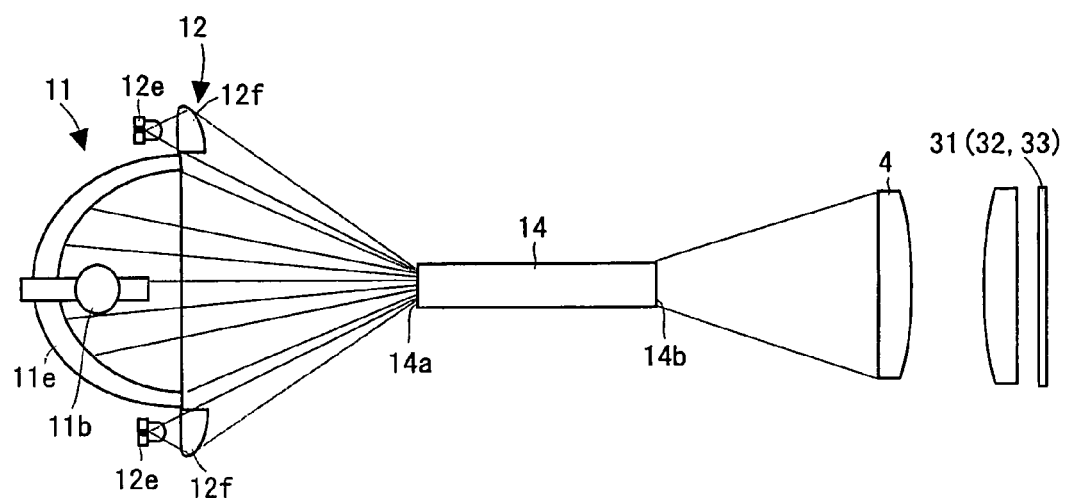
FIG. 7 is an explanatory view showing an illuminating device in a still further example of the present invention, where FIG. 7 (*a*) is a diagram for explaining the function thereof, and FIG. 7 (*b*) is a diagram for explaining an arrangement relationship between a main light source and an auxiliary light source.
Figure 7:
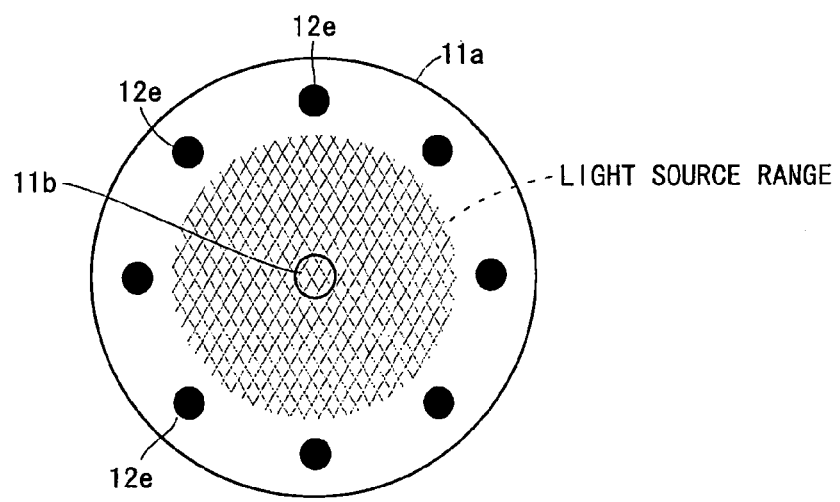

FIGS. 7 (a) and 7 (b) illustrate a still further example of the illuminating device 1. A main light source 11 in the illuminating device 1 comprises an elliptical concave mirror 11e for condensing emitted light on one point. An auxiliary light source 12 has LEDs 12e arranged therein in an annular shape in correspondence with a circular opening of the elliptical concave mirror 11e. Further, a lens 12f (corresponding to the periphery of a condenser lens) is provided on the light exit side of the LEDs 12e, to condense lights emitted from the LEDs 12e. A light condensed position by the lens 12f coincides with a light condensed position by the main light source 11. A light incidence surface of a rod prism 14 is positioned at the light condensed position.

Respective aspect ratios of a light incidence surface 14a and a light emission surface 14b of the rod prism 14 are set to the same as an aspect ratio of a liquid crystal panel 31 (32, 33). Light incident on the light incidence surface 14a of the rod prism 14 is repeatedly reflected and is integrated inside the rod prism 14, and is irradiated onto the liquid crystal panel 31 (32, 33) through a condenser lens 4 or the like. In such a configuration, a polarization conversion system 3 is not provided. Used as the rod prism 14 is one having such a shape that a portion on the emission side is larger than a portion on the incidence side. This makes it possible to reduce the degree of light divergence.

Embodiment 2

An illuminating device and a projection type video display apparatus according to an embodiment of the present invention will be described on the basis of FIGS. 8 to 9.

Figure 8:
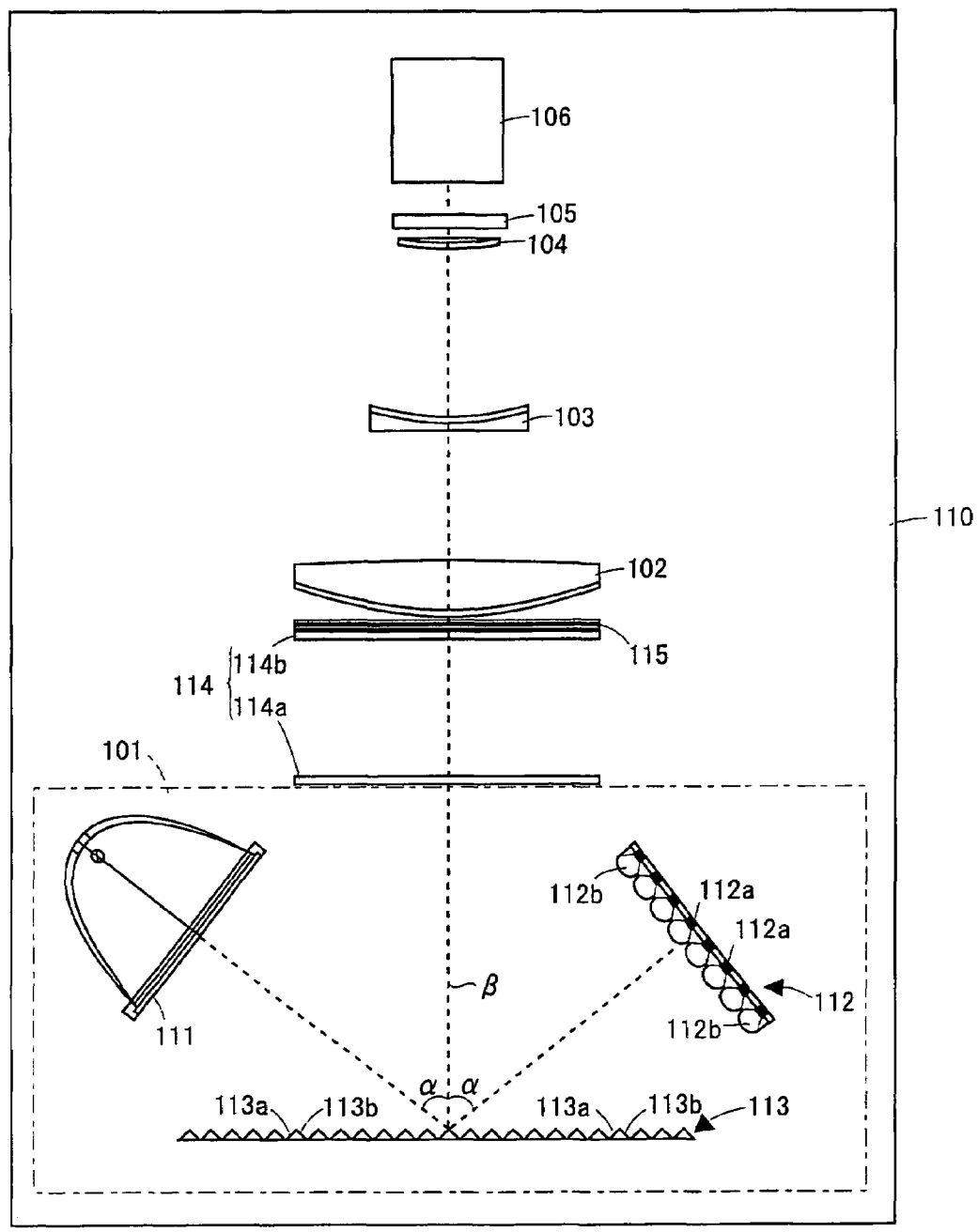
FIG. 8 is an explanatory view showing an optical system in an illuminating device and a projection type video display apparatus in the embodiment of the present invention.

FIG. 8 is a schematic view showing the configuration of an illuminating device and a projection type video display apparatus according to the embodiment of the present invention. An illuminating device 101 comprises a white light source 111, an auxiliary light source 112, and a reflecting and mixing unit 113. A projection type video display apparatus 110 comprises the above-mentioned illuminating device 101, an integrator lens 114, a polarization conversion system 115, condenser lenses 102, 103, and 104, a liquid crystal display panel 105, and a projection lens 106. Although in FIG. 8, an optical system is illustrated in a single panel configuration for simplicity of illustration, the optical system actually has a three-panel configuration (see FIG. 1), in which a color separation optical system and a color mixing system are added.

The integrator lens 114 comprises a pair of fly's eye lenses 114a and 114b and is so designed that each of pairs of convex lenses irradiates lights from the light sources 111 and 112 onto the whole surface of the liquid crystal display panel 105, to average partial luminance nonuniformity which exists in the lights emitted from the light sources 111 and 112 to reduce the difference in light amount between the center and the periphery of a screen as well as to evenly mix color light from the auxiliary light source 112 with white light.

The polarization conversion system 115 is composed of a polarizing beam splitter array (hereinafter referred to as a PBS array). The PBS array comprises polarized light separating surfaces and a phase plate (½ λ plate). Each of the polarized light separating surfaces in the PBS array passes P-polarized light of light from the integrator lens 114 and changes an optical path of S-polarized light by 90 degrees, for example. The S-polarized light whose optical path has been changed is reflected on the adjacent polarized light separating surface, and is emitted after being converted into P-polarized light by the phase plate provided on the front side (on the light exit side). On the other hand, the P-polarized light which has passed through the polarized light separating surface is emitted as it is. That is, nearly all the lights are converted into P-polarized lights in this case. Although in the above-mentioned example, all the lights are converted into P-polarized lights, all the lights can be converted into S-polarized lights by providing the phase plate at the position where the P-polarized light is emitted.

The light emitted from the illuminating device 101 leads to the liquid crystal display panel 105 through the condenser lenses 102, 103, and 104. The light incident on the liquid crystal display panel 105 becomes video light by being subjected to light intensity modulation in accordance with light transmittance set in each of pixels, and is projected on a screen (not shown) by the projection lens 106.

The illuminating device 101 will be described in detail. A light emitter in the white light source 111 is composed of an ultra-high pressure mercury lamp, a metal halide lamp, a xenon lamp, or the like, and its irradiated light is emitted after being changed into nearly parallel lights by a parabolic reflector.

The auxiliary light source 112 has LED chips 112a arranged therein in an array shape, and has lens cells for parallelizing light 112b respectively arranged therein on the light exit side of the LED chips 112a. The auxiliary light source 112 is formed in a figure similar to the integrator lens 114, for example. The LED chips 112a are molded by transparent resin, and the transparent resin is formed in a projected shape to constitute the lens cells 112b.

Selected as the LED chip 112a is one emitting light having a wavelength component of red which is considered to be insufficient from the viewpoint of color reproduction in the white light source 111. Of course, only the LED chips respectively emitting lights having the same wavelength need not be provided. For example, the LED chips respectively emitting lights having different wavelengths in a red light range may be arranged. Further, a switch may be provided such that the plurality of LED chips can be selectively energized separately divided into groups so that the LED chips can be driven to selectively emit the lights. This makes it possible to increase or decrease the amount of light having a predetermined wavelength component to enlarge the adjustable range of color reproduction. The LED chips individually produced may be arranged in an array shape to serve as the auxiliary light source 112.

The reflecting and mixing unit 113 has a lot of triangular prism-shaped portions arranged on a surface of its glass board, for example. A reflective film having a high reflectance is evaporated on surfaces, which are opposed to each other in a mountain shape, of the triangular prism-shaped portions, and the surfaces are respectively taken as first and second reflective surfaces 113a and 113b. The light sources 111 and 112 are symmetrically arranged such that an optical axis of a luminous flux emitted from the light source 111 and an optical axis of a luminous flux emitted from the light source 112 form a predetermined angle α with a perpendicular line β (an optical axis of reflected light and a perpendicular line β are made common in the drawing) on a plane perpendicular to the reflective surfaces 113a and 113b of the reflecting and mixing unit 113. An angle (apex angle) between the surfaces (reflective surfaces 113a and 113b), which are opposed to each other in a mountain shape, of the triangular prism-shaped portions and the positions of the light sources 111 and 112 are set such that the light emitted from the white light source 111 is reflected on the reflective surface 113a and is reflected in a direction parallel to the perpendicular line β, and the light emitted from the auxiliary light source 112 is reflected on the reflective surface 113b and is reflected in a direction parallel to the perpendicular line β. That is, the reflecting and mixing unit 113 mixes the light emitted from the white light source 111 and the light emitted from the auxiliary light source 112 on one optical axis not uselessly.

Although in the above-mentioned embodiment, both the lights from the first and second light sources 111 and 112 are mixed using the reflecting and mixing unit 113, both the lights from the first and second light sources 111 and 112 may be mixed after being transmitted and refracted using a transparent member having a lot of triangular prism-shaped portions provided in a row on a surface of its glass board, for example.

Figure 9:
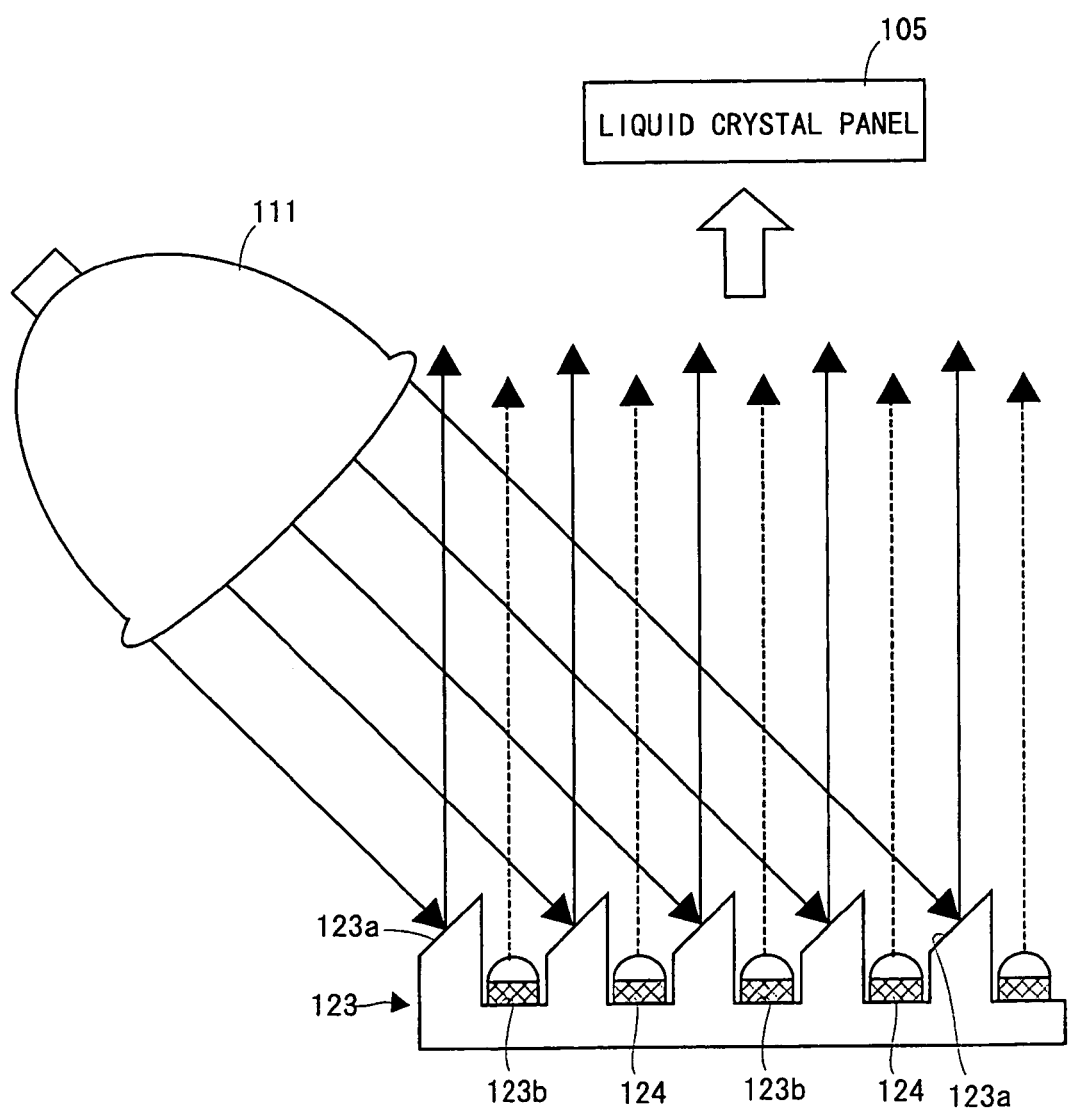
FIG. 9 is an explanatory view showing another embodiment of the present invention.

FIG. 9 illustrates another example. A reflecting and mixing unit 123 shown in FIG. 9 conforms to one respectively using the first reflective surfaces 113a in the above-mentioned reflecting and mixing unit 113 as reflective surfaces 123a and having recesses 123b formed in its areas where the second reflective surfaces 113b in the reflecting and mixing unit 113 are positioned. The recesses 123b are respectively provided with LEDs 124.

Light emitted from a white light source 111 is reflected by the reflective surfaces 123a. The LEDs 124 respectively emit approximately parallel lights in a direction parallel to the direction of the above-mentioned reflection. The LEDs 124 constitute an auxiliary light source, and respectively emit lights having a wavelength component which is considered to be insufficient from the viewpoint of color reproduction in the white light source 111. White light and auxiliary light are introduced into a liquid crystal display panel 105 after being evenly mixed with each other by an integrator lens (not shown).

Although in the above-mentioned embodiment, the transmission type liquid crystal display panel is used, the present invention is not limited to the same. For example, a reflection type liquid crystal display panel may be used. Alternatively, the liquid crystal display panel may be replaced with a light modulating element, for example, of a type for individually driving micro mirrors. Although description was made of the configuration in which there are provided three light valves, the projection type video display apparatus may be so configured that light from an illuminating device is introduced into one light valve after being separated or without being separated. The solid-state light source is not limited to a light emitting diode (LED). Further, not only a point light source but also a surface light source (an organic EL (Electroluminescence), etc.) may be used as an auxiliary light source. Although a solid-state light source having a high color purity is preferably used as an auxiliary light source, a lamp light source can be also used as an auxiliary light source, provided that it has a high color purity.

As described in the foregoing, according to the present invention, illumination for enhancing color reproduction can be performed using an auxiliary light source, thereby producing the effect of allowing high-quality video projection in a projection type video display apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An illuminating device comprising a white light source, and an auxiliary light source emitting light having a wavelength component which is considered to be insufficient from the viewpoint of color reproduction in the white light source, wherein the white light source and the auxiliary light source are arranged such that their respective optical axes cross each other, and light mixing means for mixing light from said white light source and light from said auxiliary light source and emitting the mixed light is provided at the position where the optical axes cross each other, wherein said auxiliary light source has a solid-state light source emitting parallel light arranged therein, and an optical integrator for preventing the light emitted from the solid-state light source from being introduced in a nonuniform state onto an object to be illuminated is provided on the light exit side of said light mixing means, and disposed on an axis of the mixed light.

2. The illuminating device according to claim 1, wherein a pair of fly's eye lenses is provided as said optical integrator, and each of the solid-state light sources and each of lenses composing the pair of fly's eye lenses are arranged in correspondence with each other.

3. An illuminating device comprising a white light source having a concave reflecting element, and an auxiliary light source emitting light having a wavelength component which is considered to be insufficient from the viewpoint of color reproduction in the white light source, wherein used as the auxiliary light source is one emitting only red light in a predetermined wavelength range, the auxiliary light source includes a plurality of solid-state light sources respectively emitting parallel light, the plurality of solid-state light sources arranged substantially along an opening edge of the concave reflecting element, and there is provided an optical integrator for preventing the light respectively emitted from the light sources from being introduced in a nonuniform state onto an object to be illuminated, wherein a pair of fly's eye lenses is provided as said optical integrator, and each of the solid-state light sources and each of lenses composing the pair of fly's eye lenses are arranged in correspondence with each other.

4. An illuminating device comprising a white light source, and an auxiliary light source emitting light having a wavelength component which is considered to be insufficient from the viewpoint of color reproduction in the white light source, wherein said white light source has a square light emitter by restricting a round light emitter using a shading plate, said auxiliary light source is arranged on said shading plate, and there is provided an optical integrator for preventing the light respectively emitted from the light sources from being introduced in a nonuniform state onto an object to be illuminated.

5. The illuminating device according to claim 4, wherein said auxiliary light source has a plurality of solid-state light sources respectively emitting parallel light arranged therein, a pair of fly's eye lenses is provided as said optical integrator, and each of the solid-state light sources and each of lenses composing the pair of fly's eye lenses correspond to each other.

6. An illuminating device comprising a white light source comprising a concave reflecting element, a light emitting point of said white light source being located in a concave portion of the concave reflecting element, and an auxiliary light source emitting light having a wavelength component which is considered to be insufficient from the viewpoint of color reproduction in the white light source, wherein the light emitted from said auxiliary light source is condensed in the concave portion of the concave reflecting element and in the vicinity of the light emitting point of said white light source.

7. The illuminating device according to claim 6, wherein said auxiliary light source has a plurality of solid-state light sources arranged therein, and each of the solid-state light sources has a condenser element.

8. An illuminating device comprising a white light source, and an auxiliary light source emitting light having a wavelength component which is considered to be insufficient from the viewpoint of color reproduction in the white light source, wherein light emitted from said white light source is condensed at a predetermined position, and the light emitted from the auxiliary light source is also condensed at said predetermined position, and a light incidence surface of a rod prism which is an optical integrator is located at the predetermined position, wherein the aspect ratio of the light incidence surface of the rod prism and that of a light emission surface of the rod prism are substantially the same as the aspect ratio of an object to be illuminated.

9. The illuminating device according to claim 8, wherein said auxiliary light source has a plurality of solid-state light sources arranged therein, and each of the solid-state light sources has a condenser element.

10. An illuminating device comprising:

a first light source and a second light source respectively emitting nearly parallel light, the light from the first light source being emitted in a direction different from the light from the second light source, an optical member having a first optical element for introducing the light emitted from said first light source in a particular direction and a second optical element for introducing the light emitted from the second light source in a direction parallel to said particular direction alternately arranged therein, a white light source being provided as said first light source, and an auxiliary light source emitting light having a wavelength component which is considered to be insufficient from the viewpoint of color reproduction in said white light source being provided as said second light source.

11. The illuminating device according to claim 10, wherein said auxiliary light source has a plurality of solid-state light sources respectively emitting nearly parallel light arranged therein.

12. An illuminating device comprising:

a first light source emitting nearly parallel light, an optical member having a plurality of optical elements disposed with spaces therebetween for respectively introducing the light emitted from said first light source in a direction, a second group of light sources respectively arranged in the spaces, and respectively emitting nearly parallel light in the direction, a white light source being provided as said first light source, and an auxiliary light source emitting light having a wavelength component which is considered to be insufficient from the viewpoint of color reproduction in said white light source being provided as said second group of light sources.

13. The illuminating device according to claim 12, wherein said auxiliary light source has a plurality of solid-state light sources respectively emitting nearly parallel light arranged therein.

14. In the illuminating device according to any one of claims 3, 2, 5, 7, 9, 11, and 13, an illuminating device wherein there are provided as said solid-state light sources solid-state light sources respectively emitting light having different wavelengths, and there is provided means for driving each of the solid-state light sources to selectively emit the light.

15. In a projection type video display apparatus that modulates light emitted from an illuminating device using a light valve and projects the modulated light, a projection type video display apparatus comprising as said illuminating device the illuminating device according to any one of claims 1, 2–4 and 5–13.

16. In a projection type video display apparatus that modulates light emitted from an illuminating device using a light valve and projects the modulated light, a projection type video display apparatus comprising as said illuminating device the illuminating device according to claim 14.

* * * * *